United States Patent [19]

Gregory

[11] 4,337,918
[45] Jul. 6, 1982

[54] BRACKET STRUCTURE, ESPECIALLY FOR CARRYING CORRAL SECTIONS ON A VEHICLE OR THE LIKE

[76] Inventor: James E. Gregory, R.R. #1, Box 130, Fort Madison, Iowa 52627

[21] Appl. No.: 154,715

[22] Filed: May 30, 1980

[51] Int. Cl.³ .......................................... F16M 11/00
[52] U.S. Cl. ............................. 248/201; 248/316 A; 24/263 A
[58] Field of Search ................ 248/68 R, 201, 316 A, 248/289.1; 24/263 A; 251/8; 224/42.45 R, 273

[56]     References Cited
U.S. PATENT DOCUMENTS

| 582,027 | 5/1897 | Smith | 251/8 |
|---|---|---|---|
| 1,110,973 | 9/1914 | Tischler | 248/201 X |
| 1,890,940 | 12/1932 | Fox | 248/201 |
| 2,439,623 | 4/1948 | Howells | 224/42.45 R |
| 2,680,544 | 6/1954 | Hunt et al. | 224/42.45 R |
| 2,797,852 | 7/1957 | Michalski | 224/42.45 R |
| 2,938,692 | 5/1960 | Bosworth et al. | 248/68 R |
| 3,726,256 | 4/1973 | Bernhardt | 119/20 |
| 3,741,529 | 6/1973 | Blagg | 256/26 |
| 3,921,585 | 11/1975 | Hall | 119/20 |
| 4,159,142 | 6/1979 | Larson | 296/24 C |

FOREIGN PATENT DOCUMENTS 397967 9/1933 United Kingdom .

*Primary Examiner*—William H. Schultz
*Attorney, Agent, or Firm*—Henderson & Sturm

[57]     ABSTRACT

A bracket structure is provided for the purpose denoted in the above title and comprises a carrier in the form of a letter C having an upright member and upper and lower legs projecting therefrom. The corral sections are nested between the upper and lower legs and an outer clamp element having upper and lower sockets or slide means is receivable of the legs to confine the corral sections. An intermediate element is provided for disposition between the upright member of the carrier and the corral sections and is fixable between the carrier and the clamp element for confining corral sections between the two elements in an alternate arrangement.

11 Claims, 5 Drawing Figures

BRACKET STRUCTURE, ESPECIALLY FOR CARRYING CORRAL SECTIONS ON A VEHICLE OR THE LIKE

BACKGROUND OF THE INVENTION

It is known in the prior art, for example in the U.S. Pat. to Hall, No. 3,921,585, to transport animals, especially horses, in a trailing vehicle and to carry on the sides of the vehicle a plurality of corral sections that may be detached from the parked vehicle and assembled to form a corral for the horses when they exit from the vehicle. The present invention provides several improvements over such known structures by way of carriers that are of simple, sturdy and inexpensive design; that may be readily attached to existing vehicles; and that may be conveniently manufactured and sold in cooperative sets at comparatively low prices. In a preferred form, the design utilizes readily available tubing of square cross section, joined by welding.

An important feature of the invention is the provision of such carrier that may carry only a few or several corral sections, made possible by the use of an outer clamp element receivable by the upper and lower legs of the carrier and between which and the upright member of the carrier several sections may be disposed, the whole being securely held in place by means cooperative between the element and the carrier for confining the sections against displacement during transport. When it is desired to carry only a few sections, an intermediate element may be disposed between the upright member of the carrier and the outer clamp element and the two elements are clamped together, and to the carrier, with the sections between the two elements. The securing means is designed for simple and easy connection and disconnection and the elements have slide means enabling them to be easily and relatively accurately mounted on and dismounted from the carrier.

Further features and advantages will be appreciated by those versed in the art as a preferred embodiment of the invention is disclosed in detail in the ensuing description and accompanying drawing.

DETAILED DESCRIPTION OF THE INVENTION

A typical trailer vehicle is shown as having a body, including a side wall 10, carried on wheels 12 and provided with a suitable tongue 14 for hitching to a towing vehicle, not shown. As stated preliminarily herein, it is known to transport along with the animals a plurality of corral sections, such as indicated at 16 here, alongside the body wall, preferably at both sides of the body so as to easily accomodate several such sections. According to the present invention, the carrying or transporting of the sections is achieved by a pair of carriers, each designated in its entirety by the numeral 18. Because these are or may be identical, the description of one will suffice for both.

Figure 3:
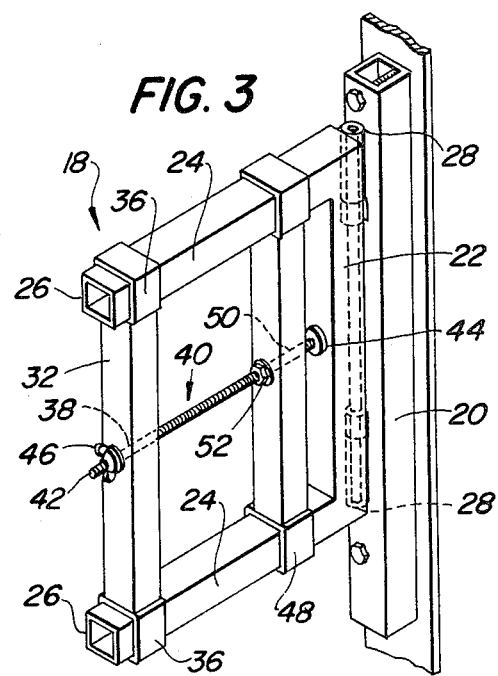
FIG. 3 is an enlarged perspective of the section-carrying bracket structure, shown without corral sections and illustrating the basic structure along with the use of the intermediate element.
Figure 4:
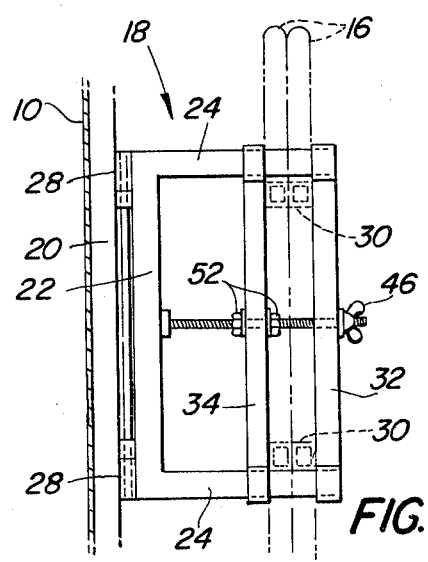
FIG. 4 shows a carrier using the intermediate element to carry a pair of corral sections, the sections being shown in broken lines.
Figure 5:
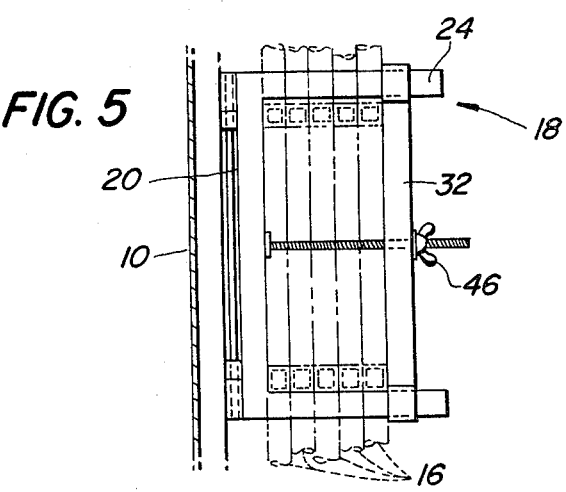
FIG. 5 shows a carrier without the intermediate element and carrying several sections, the sections again being illustrated in broken lines.

FIGS. 3, 4 and 5 best illustrate the bracket structure as comprising a carrier 20 made up of an upright member 22 having upper and lower legs 24 rigidly joined thereto and projecting horizontally outwardly therefrom in substantial parallelism and in the same direction. The legs are preferably of equal length and the carrier as such is preferably fabricated from steel tubing of square cross-section, and the joining is accomplished by welding to result in a rigid C-shaped structure. Since the legs are of equal length, they respectively have free, outer terminal ends 26 spaced apart in vertical alinement. The upright member has means for the attachment thereof to the body side wall 10, and this means is shown here as comprising upper and lower hinges 28 on a vertical axis to permit the carriers to be folded against the body side wall when not transporting corral sections.

Figure 1:
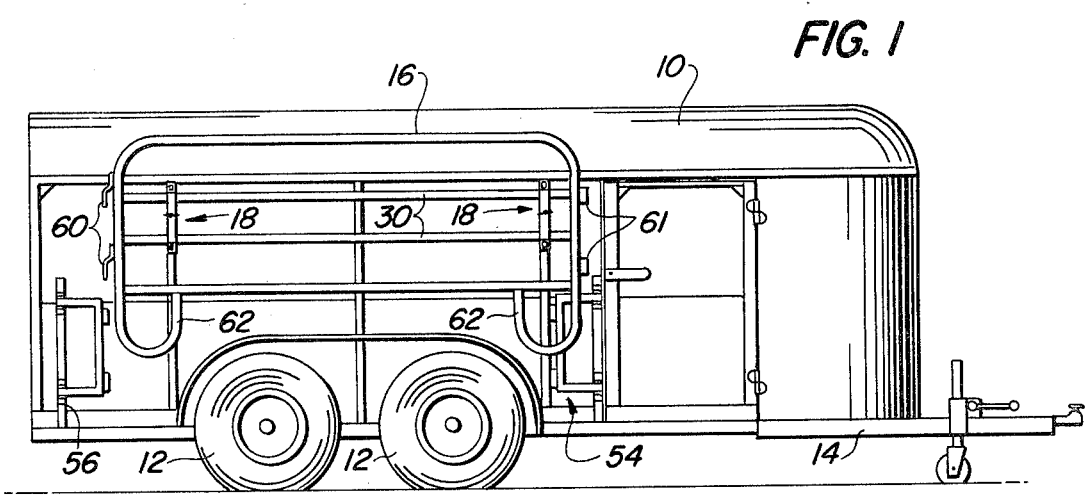
FIG. 1 is a simplified elevation of a typical trailer vehicle, showing the carrier brackets in place and carrying a plurality of corral sections.

The legs are designed with such length as to enable them to accomodate several corral sections and their vertical spacing is selected here on the basis of the vertical spacing between the second and third (from the top) bars 30 of a corral section, so that the second bar lies just below and is confined vertically by the upper leg and the third bar rests on the lower leg. See FIGS. 1 and 4 especially. This prevents bouncing and rattling of the sections during transport.

Further, the sections are confined laterally and lengthwise by cooperative elements to be described immediately. One of these is an outer, upright clamp element 32 and the other is an intermediate spacer or element 34. When several corral sections are carried; that is, a quantity to substantially occupy almost the entire length of the legs 24, the intermediate element or spacer will not be used. See FIG. 5. When fewer sections are carried, both elements may be used. See FIG. 4. FIG. 3 shows the total structure with the corral sections omitted in the interests of clarity.

The outer element is preferably an elongated piece of steel tubing of square cross-section like that of the carrier components and has opposite upper and lower end portions, each of which includes slide means 36. Each of these is preferably of square steel tubing, welded to the element and having an interior shape and dimensions comparable to the outer shape and dimensions of the leg so that each slide means is receivable of the associated leg so as to mount the element 32 on the legs for selective positioning lengthwise of the legs. The slide means also enable the element to be easily removed from and re-mounted on the legs. The element is provided intermediate its ends with a through opening 38 for receiving part of a means 40 for securing the element to the carrier. That means here comprises a threaded rod 42 connected, as by welding at 44 (FIG. 3) to the carrier upright member 22 and projecting horizontally outwardly therefrom, passing through the element opening 38 and receiving threaded means, such as a wing nut 46, which engages the element from outside. As seen in FIG. 5, the wing nut is tightened to confine the several sections between the carrier and element and within the upper and lower legs 24. When the sections are to be removed, the wing nut is removed, followed by the element 32, and the sections may be easily slid off the carrier.

The intermediate element 34 may be used when only a few (say two) sections are carried, as in FIG. 4. This element, like that at 32, has upper and lower slide means 48 and these may be constructed like those described above. Thus this element is also easily slid onto and off of the legs and is selectively positionable relative to the carrier by means of the securing means 40, the element having a through opening 50 for receiving the threaded rod 42. Stop nuts 52 are part of the means 40, being threaded onto the rod from opposite sides of the intermediate element to locate that element relative to the upright member 20 and the outer element 32. (See FIG. 4). With the element 34 properly located, the sections may be mounted on the legs as before and the outer element 32 installed, after which the wing nut is threaded on the rod and tightened, confining the sections between the two elements.

Figure 2:
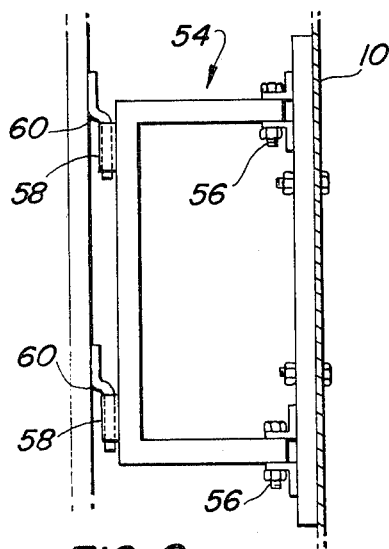
FIG. 2 is an enlarged elevation showing another form of structure hinged outwardly from the vehicle and mounting a corral section when the sections are arranged to form a corral.

In addition to the carriers 18, the body may be provided with lower, fore and aft C-shaped frames 54 (FIG. 2), each hinged to the body at 56 for swinging against the body when not in use and for swinging outwardly from the body when the corral sections are arranged as an enclosure. In this situation, each frame has upper and lower, vertically upwardly opening sockets 58. Each corral section is provided at one end with a pair of vertically spaced apart pintles 60 that are received by the sockets 58 for connecting the section to the frame. At its other end, each section has vertically spaced sockets 61. When the sections are placed end to end, the sockets 61 receive the pintles 60. When a section is connected to the vehicle via the frame, the end with the pintles 60 may be connected to the frame via the pintles and sockets. When the opposite end of the section is disposed against the frame, the sockets 58 and 61 become aligned and may receive appropriate pins, not shown. This serves to connect the corral to the vehicle and the vehicle thus becomes part of the total enclosure. For the purpose of enabling easier handling of the sections, each is provided with a pair of depending U-shaped leg extensions 62, which enables the sections be easily slid along the ground and dispenses with the use of expensive casters. Further, the extensions give the sections a broader-based ground contact.

Features not specifically enumerated will occur to those skilled in the art, as will many variations and modifications in the preferred structures shown and described, all of which may be achieved without departure from the spirit and scope of the invention.

I claim:

1. Bracket structure for attachment to a wall or the like for the purpose of carrying one or more articles, comprising: a carrier having an upright member and upper and lower generally horizontal legs spaced vertically apart and rigidly joined to the upright member and projecting outwardly therefrom in the same direction, each leg having a free, outer terminal end; means on the carrier for the mounting thereof on such wall or the like; an upright outer clamp element having opposite upper and lower end portions substantially in alinement respectively with the legs, each end portion including slide means receivable of the associated leg for selectively mounting the clamp element on and for dismounting the clamp element from the legs and also for selective positioning of the clamp element on the legs relative to the upright member; and means cooperative between the carrier and the clamp element for securing the clamp element in a selected position.

2. The bracket structure of claim 1, in which each slide means is a tube having an interior cross-sectional shape corresponding to the exterior cross-sectional shape of the associated leg.

3. The bracket structure of claim 1, including an intermediate element selectively positionable between the upright member and the clamp element and means for securing the intermediate element in a selected position.

4. The bracket structure of claim 3, including slide means at opposite ends of the intermediate element and cooperative with the legs for slidably mounting the intermediate element on the legs for selective positioning.

5. The bracket structure of claim 3, in which the means for securing the intermediate element in selected positions is part of the means for securing the clamp element in selected positions.

6. The bracket structure of claim 1, in which the means for securing the clamp element to the carrier includes a threaded rod connected to the upright member intermediate the legs and projecting outwardly from said member in substantial parallelism with the legs, said clamp element has an opening therethrough for receiving the rod, and threaded means cooperates with the rod outwardly of the clamp element and engageable therewith.

7. The bracket structure of claim 1, including an intermediate element selectively positionable between the clamp element and the upright member, and wherein the means for securing the clamp element to the carrier includes a portion engageable with the interemediate element to secure said intermediate element in selected positions.

8. The bracket structure of claim 7, in which the means for securing the elements relative to the carrier includes a threaded rod connected to the upright member intermediate the legs and projecting outwardly from the member in substantial parallelism with the legs, said elements respectively have alined openings therethrough for receiving the rod, said rod extends outwardly beyond the clamp element, and threaded means cooperates with the rod and engages the clamp element.

9. The bracket structure of claim 8, including additional threaded means on the rod for engaging the intermediate element.

10. The bracket structure of claim 9, including slide means respectively at opposite ends of the intermediate element and receivable of the legs.

11. The bracket structure of claim 1, in which the means for the mounting of the carrier includes hinge means on an upright axis.

* * * * *